Dec. 22, 1964  C. S. TAYLOR  3,161,965
TURNING RADIUS GAUGE
Filed Feb. 8, 1963

INVENTOR.
Carl S. Taylor
BY
Dale A. Winnie
ATTORNEY

United States Patent Office 3,161,965
Patented Dec. 22, 1964

3,161,965
TURNING RADIUS GAUGE
Carl S. Taylor, Springfield, Ill., assignor to Dura Corporation, Oak Park, Mich., a corporation of Michigan
Filed Feb. 8, 1963, Ser. No. 257,307
11 Claims. (Cl. 33—203)

This invention relates to equipment for checking the steering alignment of vehicle wheels, and more particularly to an improvement in turning radius gauges which are used for such purposes.

Turning radius gauges which are used to check the steering alignment of automotive vehicles usually include separate units received under each of the vehicle steering road wheels. Each of the units includes a road wheel supporting member which is suitably journaled for easy turning with the wheel it supports. The units operate independent of each other except as connected in use through the steering linkage of the steering wheels being checked.

In use, one of the vehicle steering wheels is turned to an angular position relative to a fixed calibrated scale adjacent the wheel supporting part of the turning radius gauge. The other steering wheel should then assume a like or comparable angular position, with the Ackerman effect taken into consideration, and any variations in the angular readings obtained on the two gauges indicates a steering alignment problem.

One of the principal shortcomings in the use of present turning radius gauges is that two men are needed to operate the equipment. This is due to the amount of castor and other steering wheel characteristics built into present day cars which practically precludes their staying positioned at any appreciable angle. Accordingly, it is necessary for one of the servicing attendants to hold one of the wheels angularly disposed while another attendant reads the induced turning radius angle of the other wheel.

Wheel position locking devices have not solved this problem since an attendant is still needed at both wheels to lock and read the different gauges or else one attendant must cross to the other wheel to make the reading and then return to unlock the preset wheel.

It is an object of this invention to provide a turning radius gauge suitable for use in pairs and which is operable by one service attendant without crossing back and forth from one side to the other of the vehicle being checked.

It is an object of this invention to provide a simple wheel position locking device for use with turning radius gauges and which enables accurate wheel positioning at one gauge and ready release from the location of the other radius gauge.

It is an object of this invention to provide wheel positioning lock means for use on turning radius gauges and which are operable from the remote position of the complementary gauge device without having any direct interconnection therebetween.

More specifically, it is an object of this invention to provide a wheel position locking device making use of the inherent tendency of a steering wheel to assume a zero steering angle and enabling disengagement thereof through the steering linkage of the wheels being checked as by manual readjustment of the other wheel.

To be still more precise, it is an object of this invention to provide a simple and inexpensive adjustment screw device for stop engagement and increment adjustment of the wheel supporting member of a turning radius gauge and to have such device biased for retraction and disengagement with its respective wheel supporting member upon over adjustment of the other steering wheel being checked.

Other objects include simplicity of design and operation, ready adaption to prevent turning radius gauges as a field change, ease of assembly and operation, and the use of a minimum of parts for compactness and manufacturing economy.

These and other objects and advantages to be gained in the practice of this invention will be better understood and appreciated upon a reading of the following specification in regard to a preferred embodiment of the invention and having reference to the accompanying drawings wherein.

Figure 1:
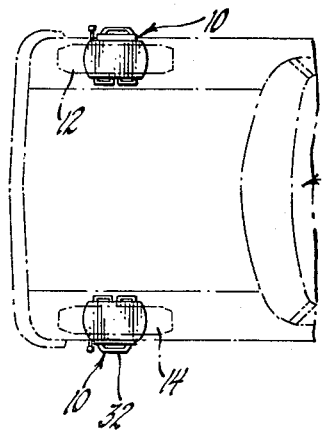
FIGURE 1 is a top plan view of a pair of steering wheel turning radius gauges as adapted for use with an automotive vehicle shown in phantom outline thereover.
Figure 2:
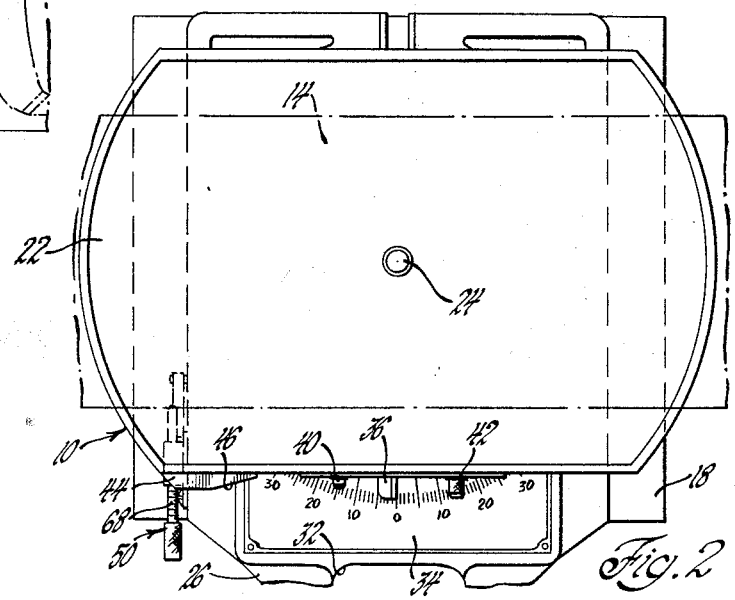
FIGURE 2 is an enlarged top plan view of one of the turning radius gauges shown by FIGURE 1.
Figure 3:
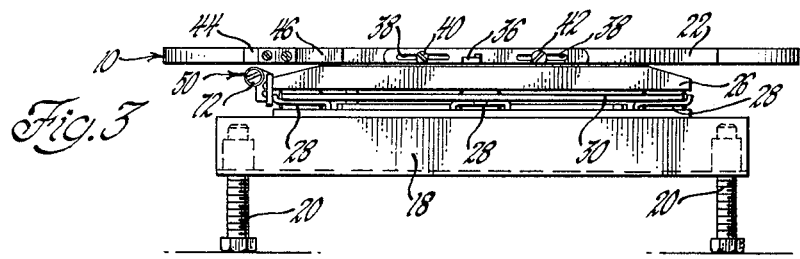
FIGURE 3 is a side view of the turning radius gauge shown by FIGURE 2.
Figure 4:
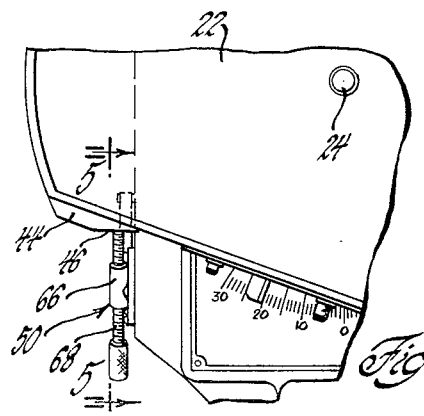
FIGURE 4 is a fragmentary top plan view of the turning radius gauge shown by FIGURE 2 as seen in a different and adjusted position.
Figure 5:
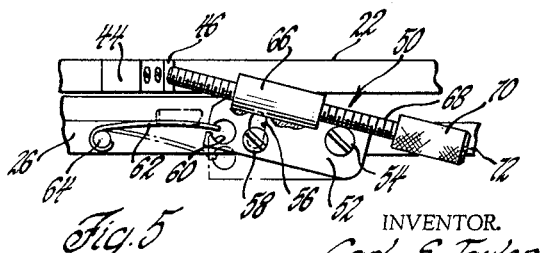
FIGURE 5 is a side view of the adjustment and stop screw detail of the turning radius gauge shown by FIGURE 4 and as seen in the plane of line 5—5 thereon.

The steering alignment checking equipment of this invention makes use of a pair of turning radius gauges 10 which are essentially the same except as adapted for use under right or left vehicle steering road wheels. Such gauges are shown by FIGURE 1 as disposed under the steering road wheels 12 and 14 of an automotive vehicle 16 shown in phantom outline disposed thereover.

Since the turning radius gauges 10 used for checking the steering alignment of vehicle road wheels are essentially the same, as mentioned, only one thereof need be described in detail.

Each turning radius gauge 10 includes a stand 18 having elevating foot screws 20 provided on the underside thereof. The foot screws are used in leveling the turning radius gauges, as will later be more fully appreciated.

A wheel supporting member 22 is horizontally and pivotally disposed on the stand 18. It is pivotally rotatable about an axis pin 24 and is suitably journaled for turning ease with a vehicle wheel supported thereon.

The wheel supporting member 22 is spaced slightly above the stand 18 and is receptive of a retractable member 26 disposed thereunder and reciprocal on the stand from a shielded protection under the wheel supporting member. The retractable member 26, which may be considered part of the stand 18, is supported on roller bearings 28 suitably retained within a cage 30 provided on the stand. A handle 32 on the retractable member 26 enables it to be pulled out from under the wheel supporting member 22 and to unlock the wheel supporting member for free turning movement. The handle also serves as a means for removing the whole assembly from under a vehicle wheel and for picking up the unit. However, this is commonly known with other turning radius gauges and since it forms no immediate part of the present invention has not been shown by the drawings nor is considered necessary to describe in any detail.

The retractable member 26 is provided with a turning radius indica plate 34 which is suitably marked to read from zero to thirty degrees in opposite directions.

The wheel supporting member 22 includes an adjustable pointer 36 provided on a plate secured to the edge thereof disposed over the turning radius indicia plate 34. Adjustment slots 38 cooperate with a guide pin 40 and lock screw 42 to enable adjustment of the pointer 36 relative to the zero marking on the turning indica plate, as will subsequently be more fully appreciated.

A shoulder stop 44 is provided on one corner of the wheel supporting member 22 and is formed to include an angular shoulder 46 which serves a specific purpose later described.

An adjustable stop 50 is mounted on the retractable member 26 which, when disposed in position for use, is a part of the stand 18 and is immobile with respect to the wheel supporting member 22 as rotatably supported thereon.

The adjustable stop 50 includes a bracket plate 52 which is engaged to the side edge of the member 26 by means of a pivot pin screw 54. The bracket plate includes a guide slot 56 through which extends a guide pin 58. It is accordingly pivotal about the pivot pin screw 54 within the limits defined by engagement of the guide pin 58 within the ends of the guide slot 56.

A spring receptive slotted access 60 is formed in the bracket plate 52 and receives the terminal end of a leaf spring member 62 which is secured to an anchor pin 64 engaged with the bracket plate 52 to the side edge of the retractable member 26.

An internally threaded cylindrical member 66 is welded to the upper edge of the bracket plate 52. An elongated screw 68 is received in threaded engagement through the cylindrical member 66. It includes a knurled head 70 for thumb and finger adjustment of the screw and has a screw drive slot 72 provided in the end thereof.

As will subsequently be better appreciated, the adjustable stop 50 is pivotally positionable so that the end of the adjustment screw 68 can be disposed for stop engagement with the shoulder stop 44 on the wheel supporting member 22. At the same time the leaf spring 62 biases the adjustable stop 50 so that the adjustment screw 68 is removed from a position where it will afford stop positioning of the wheel supporting member 22. The use of the stop positioning and the retracting features will better be understood in a description of the use of the turning radius gauge 10 for steering alignment checking purposes.

In practice, a vehicle is driven onto an alignment rack or twin post lift to be used with a set of the disclosed turning radius gauges 10 which, together, form a portable alignment outfit.

After the vehicle is disposed on the alignment rack or twin post lift, all tires are inflated to correct pressure and the front end of the vehicle is raised on the lift or jack. In such elevated position the king pin bushings or wheel joints, wheel bearings, tie rod ball pivots and control arm pins are checked for looseness and all excess play is eliminated in the steering linkage.

A turning radius gauge 10 is then placed under each front wheel with the adjustable stop 50 disposed on the side nearest the front of the vehicle. The gauge is located under the center of the tire with the pointer 36 set at zero relative to the turning radius indicia plate 34. The wheels are set straight ahead and the car is lowered to dispose the vehicle road wheels on the wheel supporting members 22.

Prior to initial use, the turning radius gauges 10 should be adjusted with respect to rear wheel chocks (not shown) so that the car will be level both across the front end and from front to rear.

With the vehicle wheels in a straight ahead position, the pointer 36 is adjusted on each gauge, if necessary, to register exactly zero.

The turning radius gauges 10 are now ready to be used for steering alignment checking purposes.

Beginning with the right front wheel, for purposes of discussion only, the steering wheels are manually turned to the left to simulate a left turn. They are turned until the pointer 36 on the wheel supporting member 22 registers slightly more than a twenty degree turn. The adjustable stop 50 is then elevated against the bias of the spring 62 and the screw 68 is adjusted to engage the shoulder 46 of the stop 44 on the wheel supporting member. The adjustment screw 68 is then backed off slightly to dispose the wheel supporting member 22 at a position of exactly twenty degrees.

It should be mentioned here that there is a tendency for the steering wheels to return to a zero position due to the amount of caster and other steering characteristics built into present day cars. Accordingly, the wheel supporting member 22, is, in effect, biased through the road wheel which it supports for both stop engagement and retaining engagement with the adjustment screw 68 which has been elevated for shouldered engagement with the stop 44 on the wheel supporting member.

With the right vehicle wheel held in a twenty degree left turn, the servicing attendant crosses to the left side of the vehicle and obtains a turning radius reading from the gauge under the left wheel. This reading should correspond to a reading of twenty degrees with the Ackerman effect, due to the wheels being set to travel in arcs of concentric circles of different radii, taken into consideration.

The servicing attendant next turns the left wheel out, or further into a left turn, which may be considered as overpositioning the steering wheel. In so doing, the wheel supporting member 22 under the right wheel moves out of engagement with the adjustment screw 68 and the spring 62, acting on the bracket plate 52, retracts the adjustable stop 50 from a stop engaging position relative to the wheel supporting member and so enables the servicing attendant to turn the vehicle wheels to the right to simulate a right turn.

From the left hand side of the vehicle the wheels are turned until the gauge under the left wheel registers slightly more than twenty degrees, the adjustment screw 68 on such gauge is adjusted until the reading is exactly twenty degrees, the attendant crosses to the other side of the vehicle, makes a comparison reading, over-positions the steering wheels to release the adjustable stops 50 on the left hand gauge and the steering alignment check is completed.

It will be appreciated that the adjustable pointer 36 and the adjustable aspects of the screw 68 enable precise positioning of the vehicle steering road wheels on the turning radius gauges 10.

The angular shoulder 46 on the shoulder stop 44 of the wheel supporting member is disposed normal to the end of the adjustment screw 68 when the supporting member 22 is in a twenty degree angular relation and accordingly assures the best possible stop engagement for retaining the adjustment stop in its elevated position as well as for angular adjustment of the wheel supporting member 22 on the stand.

The flat leaf spring 62 has its end received in the spring receptive slotted access 60 in a manner which allows it to flex freely as the adjustment screw 68 is raised to hold the wheel supporting member in its desired position. Only slight over positioning of the other vehicle wheel, after the turning radius has been read, is necessary to back off the shoulder stop 44 from the adjustment screw 68 and allow the spring 62 to retract the bracket plate 52 and the screw to a horizontally disposed position free from engagement with the wheel supporting member. Accordingly the other wheel may be turned, set and checked for the turning radius angle and then released in the same manner.

Although a preferred embodiment of this invention has been shown and described in detail, it will be appreciated that certain modifications and improvements are within the scope of the teachings set forth. Accordingly, such of these improvements and modifications as are within the spirit of the invention and are not specifically excluded by the language of the hereinafter appended claims, are to be considered as inclusive thereunder.

I claim:
1. A device for checking the turning radius of vehicle steering road wheels, and comprising:
   (a) a vehicle wheel supporting member journaled for wheel turning ease in opposite directions from and back to a given position,

(b) means for engaging and stopping of said vehicle wheel supporting member in one of said turning directions, (c) and means operatively engaged by said stopping means for automatic retraction thereof upon over-positioning of said supporting member.

2. A turning radius checking device, comprising:

(a) a stand (b) a vehicle road wheel supporting member rotatably mounted on said stand, (c) turning radius indicia provided on said stand and wheel supporting member, (d) means operative of said wheel supporting member for repositioning thereof from and beyond a selected angular disposition to a zero turning radius position, (e) and retractable stop means provided on said stand and disposed for engagement with said supporting member in a selected angular disposition thereof for precluding repositioning to said zero turning radius position.

3. The turning radius checking device of claim 2, including:

(f) said stop means being adjustable.

4. The turning radius checking device of claim 3, (g) said stop means including a pivotally retractable member having an adjustment screw threaded therethrough and disposed for engagement with said repositionable wheel supporting member.

5. The turning radius of claim 2, (f) said stop means including self-retracting spring means provided on said stand and engaged thereto for holding said stop means normally disposed free from engagement with said wheel supporting member.

6. A device for use in checking the turning radius of vehicle steering road wheels, and comprising:

(a) a vertically adjustable stand having a vehicle wheel supporting member horizontally and rotatably supported thereon to afford substantially free turning ease for a vehicle wheel received thereof, (b) turning radius indicia provided on said stand and said wheel supporting member, (c) steering means operative of said vehicle wheel and said supporting member in turn for repositioning the latter to a substantially zero turning radius position from any selected angular steering disposition relative to said stand, (d) a member pivotally mounted on one side of said stand and having an adjustment screw threaded therethrough, (e) said screw being positionable by said member for stop engagement with said wheel supporting member on the repositionable side thereof, (f) and means normally biasing said pivotal member for removing said screw from a disposition for stop engagement with said wheel supporting member.

7. Equipment for checking the turning radius of vehicle steering road wheels, and comprising:

(a) a pair of turning radius checking gauges for disposition one under each vehicle steering wheel, (b) comparable turning radius checking indicia provided on each of said gauges, (c) means for biasing said gauges for return to a substantially zero turning radius position from any other positioning thereof, (d) means operatively disposed for stop engagement with at least one of said gauges in a selected turning radius indicating position thereof, (e) and said stop engagement means being self-retractable upon over-positioning of the other of said gauges.

8. The method of checking the turning radius of vehicle steering road wheels having substantially zero radius resetting characteristics, including the steps of:

(a) angularly positioning one of a set of steering wheels relative to angular position reading indicia under each of said steering wheels, (b) disposing means in stop retained engagement with said one steering wheel and for precluding repositioning thereof, (c) comparing the angular position reading indicia under oppositely disposed of said steering wheels, (d) and over-positioning one of said oppositely disposed steering wheels for disengaging said stop retained engagement means from repositioning precluding engagement with said one steering wheel.

9. A device for checking the turning radius of vehicle steering road wheels, and comprising;

means for receiving and supporting a vehicle steering road wheel for turning in opposite directions from and back to a given position, means for engaging said wheel supporting means in at least one of said turning directions and stopping said wheel supporting means from returning to said given position, and means operatively engaged by said stopping means for retraction thereof in response to further turning of said wheel supporting means in said one turning direction.

10. The turning radius checking device of claim 9, including;

means biasing said wheel supporting member for substantially automatic return to said given position.

11. The turning radius checking device of claim 10, said retraction means including a leaf spring biasing said stopping means in a normally retracted disposition.

References Cited in the file of this patent

UNITED STATES PATENTS

| | | |
|---|---|---|
| 942,656 | Moore | Dec. 7, 1909 |
| 1,003,652 | Regan | Sept. 19, 1911 |
| 2,045,108 | Smith | June 23, 1936 |
| 2,087,909 | Haucke | July 27, 1937 |
| 2,197,468 | Graham et al. | Apr. 16, 1940 |
| 2,250,742 | Bennett | July 29, 1941 |
| 2,503,580 | Fontaine | Apr. 11, 1950 |